Patented June 9, 1936

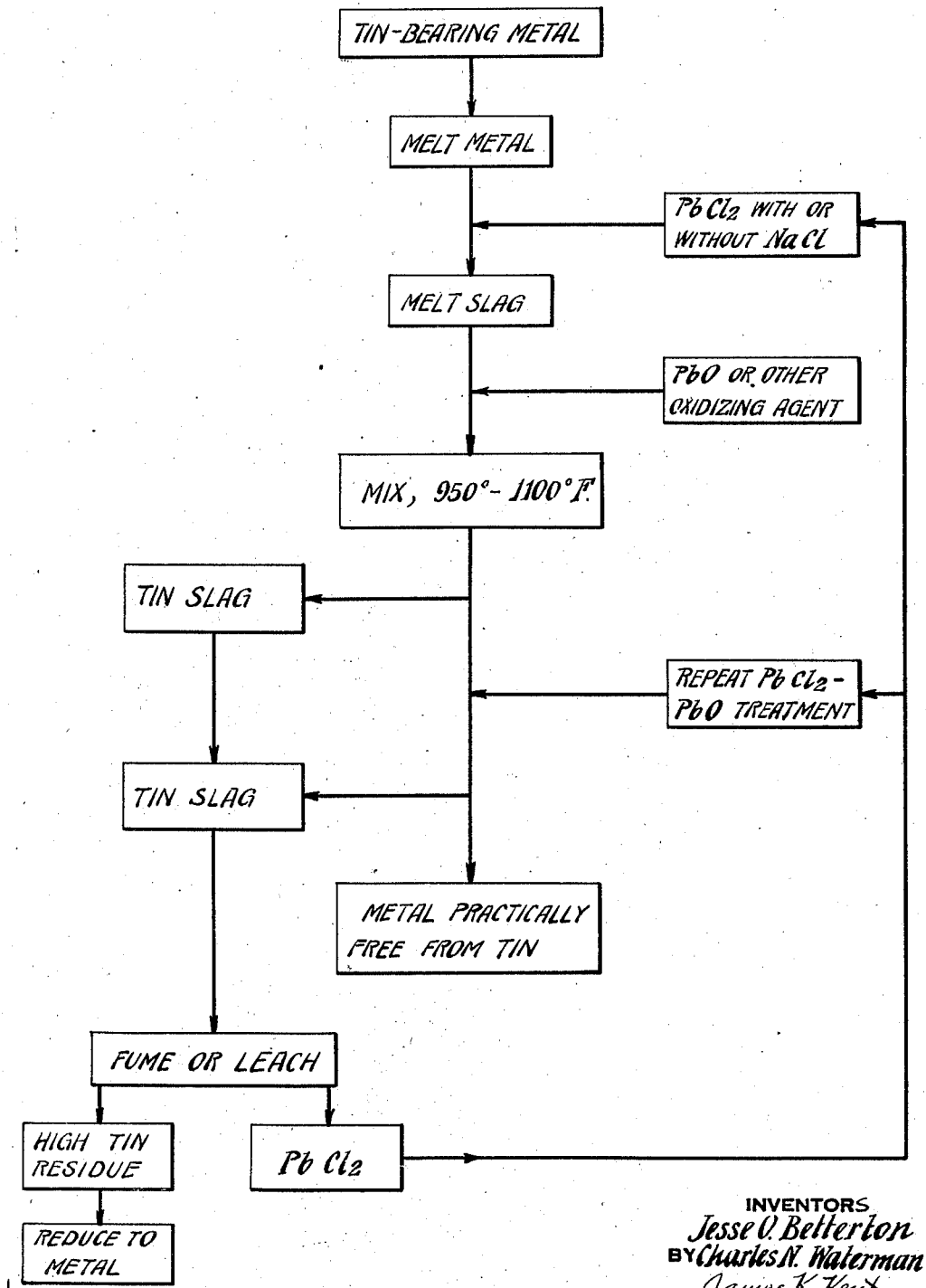

2,043,573

UNITED STATES PATENT OFFICE 2,043,573

PROCESS FOR RECOVERING TIN

Jesse O. Betterton, Metuchen, N. J., and Charles N. Waterman, Monterrey, Mexico, assignors to American Smelting and Refining Company, New York, N. Y., a corporation of New Jersey Application May 26, 1934, Serial No. 727,674

15 Claims. (Cl. 75—85)

This invention relates to the treatment of metals or alloys containing tin and provides a process by which tin may be readily separated and recovered from tin-bearing alloys of lead, antimony, bismuth and the like, for example, various type metal compositions, tin-bearing antimonial leads, solders, etc. and the reclaimed scrap from such products. The invention further provides for the recovery and reuse in an efficient manner of a large portion of the reagents employed in effecting the tin separation.

In accordance with the invention the tin-bearing metal, for example, tin-lead or tin-antimonial lead, is treated in the molten state with an oxidizing agent in the presence of lead chloride. As a result the tin is oxidized without any appreciable loss by volatilization and concentrated in a slag of relatively small volume substantially free from such elements as arsenic, antimony, copper, bismuth, selenium, tellurium and precious metals which may be present in the original metal. The slag is then either fumed or leached for the recovery of lead chloride which is returned to the process for the purpose of treating additional quantities of metal while the residue containing the tin is readily reduced by smelting with coke to yield a metal of high tin content or otherwise processed for the recovery of tin.

The drawing accompanying and forming part of the specification is a flow sheet illustrating the process of the invention.

Employing standard apparatus, the invention may be practiced as follows: The tin-bearing metal or alloy is melted in a cast iron kettle and preferably drossed in order to insure a clean surface to which is added the lead chloride, preferably with sodium chloride in eutectic proportions (approximately 93% $PbCl_2$—7% NaCl and melting at about 770° F.). The metal is heated to a proper temperature, for example 950° F. to 1100° F. and a mixing machine such as is ordinarily employed in lead refining operations is installed in the bath. The oxidizing agent, preferably lead oxide or other solid oxidizing agent such as niter, lead oxide-lead sulfate, etc., is then added to the molten bath. If the mixing machine is of the variety which produces a vortex in the bath, the oxidizing agent is appropriately added to said vortex as the mixing operation progresses.

The relative amounts of lead chloride and oxidizing agent used may be widely varied to suit various operating conditions. Obviously, the actual quantities employed in any given operation will be largely governed by the tin content of the bath. In actual practise a lead chloride to lead oxide ratio of 1:1.3 has given excellent results although it is to be understood that such ratio is purely empiric.

As a result of the foregoing treatment, that is, the oxidation (by air, oxidizing gases or solid oxidizing agents) of the metal in the presence of lead chloride, the tin is selectively oxidized from the metal and concentrated in the slag. The slag is then removed and the lead chloride-oxidation treatment repeated if necessary until the metal is substantially free from tin. The tin slag is then treated for the recovery of lead chloride which is accomplished either by heating the slag thereby volatilizing the lead chloride and appropriately collecting the fume as in a baghouse or by leaching the slag preferably with a hot concentrated brine solution and recovering the lead chloride from the leach solution. In either case the tin remains as a residue which may readily be reduced with coke to yield a high tin metal. The recovered lead chloride is returned to the system for treating further quantities of tin-bearing metal.

The following examples will serve to illustrate the efficiency of the invention in separating tin from tin-bearing metals or alloys:

*Example I*

A mixture of lead chloride and sodium chloride in eutectic proportions was added to a molten bath of tin-bearing antimonial lead. Thereafter, litharge was added and the bath stirred for one hour at a temperature of 950° F.–1000 F. after which the tin slag was skimmed and the treatment repeated. The tin content of the bath at the time the first slag was skimmed was 0.8%. The analyses of the original metal, first and second slags and the final metal were as follows:

|  | Original metal | First slag | Second slag | Final metal |
|---|---|---|---|---|
| Tin (%) | 4.0 | 21.8 | 18.1 | 0.1 |
| Antimony (%) | 22.1 | 2.1 | 3.7 | 21.9 |
| Arsenic (%) | 0.28 | 0.42 | 0.43 | 0.73 |
| Copper (%) | 0.89 | 0.55 | 0.39 | 0.62 |
| Lead (%) | 72.2 | 44.8 | 49.2 | 76.1 |

*Example II*

In this instance the alloy was melted, lead chloride added to the surface of the molten metal and the bath stirred for half-hour periods during which time litharge was added. Four such treatments were effected within a temperature range of from 950° F. to 1100° F. and four skimmings were made. The four slags in the order of their removal analyzed 23.2%, 19.8%, 16.2% and 12.8% tin respectively and contained only minor quantities of other elements except lead which was shown by analysis to be 49.5%, 53%, 56.8% and 64.5% respectively. The metal analyses were as follows:

|  | Original | After 1st skim | After 2nd skim | After 3rd skim | Final |
| --- | --- | --- | --- | --- | --- |
| Tin (%) | 27.8 | 13.3 | 4.7 | 1.1 | 0.04 |
| Antimony (%) | 10.8 | 8.9 | 7.6 | 7.1 | 7.0 |
| Arsenic (%) | 0.78 | 0.75 | 0.55 | 0.45 | 0.4 |
| Bismuth (%) | 7.05 | 7.3 | 7.4 | 7.6 | 7.8 |
| Copper (%) | 2.53 | 2.95 | 3.22 | 3.36 | 3.43 |
| Lead (%) | 49.4 | 65.1 | 74.8 | 78.7 | 79.6 |
| Selenium (%) | 0.02 | 0.02 | 0.01 | 0.02 | 0.02 |
| Tellurium (%) | 0.98 | 1.0 | 1.02 | 0.98 | 1.0 |

As previously stated, the tin slags are treated either by leaching or fuming for the recovery of the lead chloride therein contained which is returned to the process for the treatment of further quantities of metal. The following examples will serve to illustrate the efficiency of this step in the process:

Example A

A slag produced in accordance with the invention was crushed and charged to a fuming furnace suitably equipped with flues and bags, and heated indirectly by radiant heat. The charge was brought to a temperature of approximately 1600° F.–1800° F. and rabbled at intervals until samples of the slag showed a constant tin content thus indicating the volatilization of lead chloride was complete. This treatment resulted in obtaining practically 100% of the tin as a residue and over 85% of the lead as fume; the former being readily reduced to tin metal and the latter returned to the system for the treatment of additional tin-bearing metal. The analysis of the slag, tin residue and baghouse fume was as follows:

|  | Slag | Residue | Fume |
| --- | --- | --- | --- |
| Tin (%) | 13.9 | 38.4 | 0.12 |
| Antimony (%) | 2.5 | 5.0 | 0.15 |
| Arsenic (%) | 0.26 | 0.49 | 0.02 |
| Chlorine (%) | 18.7 | 4.9 | 24.3 |
| Lead (%) | 48.8 | 16.4 | 71.9 |

Example B

In this instance the slag obtained by subjecting the tin-bearing metal to oxidation in the presence of lead chloride in accordance with the invention was crushed to 80-mesh and leached with hot (200° F.) brine solution in a suitable tank after which it was allowed to settle, decanted and the cake again leached with hot brine solution. The cake was then worked with hot water and dried, the leach and wash solutions being combined and cooled whereupon the lead chloride which separated out was dried and reused to treat additional metal while the filtrate was returned to the leaching system. The cake (residue) containing approximately 95% of the tin in the slag was readily smelted with coke to metal. The following analyses illustrate the success attending this alternative method for treating the tin slag to recover the lead chloride:

|  | Slag | Dry tin cake | Dry PbCl₂ cake |
| --- | --- | --- | --- |
| Tin (%) | 23.2 | 56.3 | 0.25 |
| Antimony (%) | 0.56 | 0.45 | 0.16 |
| Lead (%) | 49.5 | 14.7 | 72.2 |
| Chlorine (%) |  |  | 23.4 |

It will be seen from the above that the process of the present invention embraces the concept of forming a layer of slag on a tin-containing bath, which slag contains a material reducible by the tin to form a tin compound in the slag. In practice, the resulting tin compound is converted into a form inactive under the conditions of operation, so that the desired reactions may proceed to substantial completion. This conversion is accomplished by incorporating in the slag a reactant for the tin compound produced in the slag by the above-indicated reduction, the reactant not only converting the tin entering the slag into an inactive compound, but also reacting upon the tin metal in the bath and converting same into the same inactive end product which enters into and is retained by the slag.

Lead chloride, being reducible by tin to metallic lead with formation of stannous chloride, is the most suitable ingredient to be used in the slag and the resulting stannous chloride is in turn easily oxidizable to stannic oxide which remains in the slag as an inert component thereof. Lead oxide is a very suitable oxidizing agent as its reaction with the stannous chloride results in a regeneration of lead chloride.

The reactions involved may be represented in two stages as follows:

(1) $$PbCl_2 + Sn \rightleftarrows SnCl_2 + Pb$$
$$\text{(Slag)} \quad \text{(Bath)} \quad \text{(Slag)}$$

It will be observed from the above that reaction (1) is reversible, being an equilibrium reaction in which the equilibrium point favors a predominance of lead over tin since the heat of formation of lead chloride is somewhat higher than that of stannous chloride. Therefore, when it is attempted to carry out the above reaction only a small amount of tin will react with lead chloride to form stannous chloride; but if, as through oxidation, the resulting stannous chloride is converted into a product which is inactive towards the slag and bath, the above reaction will proceed to completion. Oxidation of the stannous chloride by lead oxide proceeds in accordance with the reaction:

(2) $$SnCl_2 + 2PbO = SnO_2 + PbCl_2 + Pb$$

The lead chloride is thus regenerated and the tin oxide remains in the slag as an inert ingredient. Thereupon, further quantities of tin enter into reaction with the lead chloride as indicated by the first reaction above to form further quantities of stannous chloride and these reactions continue until the tin has been converted substantially completely into inert oxide, the reduced lead entering the bath.

It will be seen that the reaction not only takes place in the layer of slag but that also, as the slag and bath are brought into intimate contact, the tin in the bath and the lead oxide in the slag will react:

$$Sn + 2PbO = SnO_2 + 2Pb$$
$$\text{(Bath)} \quad \text{(Slag)} \quad \text{(Slag)}$$

The resulting stannic oxide enters the slag and adds to that being formed therein by the interaction of the stannous chloride with the lead oxide. The double action of the lead oxide on the tin in both slag and bath very materially accelerates the detinning action.

As indicated above, the slag is treated for the recovery of the lead chloride which is returned to the system and the tin residue may be reduced with coke to yield a high tin metal.

From the foregoing description and illustrations, it will be readily apparent to those skilled in the art that the present invention provides an efficient commercial process for separating and recovering tin from tin-bearing metals and alloys. By it the tin is concentrated in a slag of small volume which is readily processed to yield a tin residue readily convertible into marketable tin products and lead chloride suitable for reuse in the process.

As already pointed out the lead chloride may be used alone or in combination with other salts such as sodium chloride, the latter serving to lower the melting point and the former functioning as a solvent for the oxidizing agent and providing a fluid slag in intimate contact with the metal allowing secondary reactions to occur.

While certain novel features of the invention have been disclosed and are pointed out in the annexed claims, it will be understood that various omissions, substitutions and changes may be made by those skilled in the art without departing from the spirit of the invention.

What is claimed is:

1. The process for treating a tin-bearing lead alloy which comprises oxidizing the alloy in the molten state in the presence of lead chloride thereby concentrating the tin as a slag, recovering lead chloride from said slag whereby the tin remains as a residue, treating additional quantities of such an alloy with the lead chloride so recovered and reducing the tin residue to metal.

2. The process for treating tin-bearing alloys of lead and/or antimony which comprises subjecting a molten bath of same to the oxidizing action of litharge dissolved in a slag comprising lead chloride and sodium chloride thereby concentrating tin in the slag, recovering lead chloride from said slag whereby the tin remains as a residue, reducing the tin residue to metal and recirculating the recovered lead chloride to a subsequent bath of alloy.

3. In separating tin from a tin-bearing metal, the improvement which consists in selectively oxidizing the tin from the metal in the presence of lead chloride thereby concentrating the tin as a slag.

4. The process for treating lead-tin alloys which comprises melting said alloys and contacting the molten metal with molten lead chloride having lead oxide dissolved therein thereby selectively oxidizing and concentrating the tin in a slag of relatively small volume.

5. The process for treating tin-bearing metal which consists in subjecting a molten bath of such metal to successive treatments with litharge in the presence of lead chloride thereby concentrating the tin in a series of slags and separating the metal and slag between each of said successive treatments.

6. The process for treating tin alloys which comprises oxidizing such alloys in the presence of lead chloride thereby concentrating tin as a slag, recovering lead chloride from said slag and utilizing same for the treatment of further quantities of tin alloys.

7. The process for treating tin alloys which comprises oxidizing such an alloy in the presence of lead chloride thereby concentrating tin as a slag, recovering lead chloride from said slag by leaching same whereby the tin remains as a tin-rich residue and utilizing the recovered lead chloride for the treatment of additional quantities of tin alloy.

8. A process of removing tin from alloys containing tin which comprises forming a fused bath of the alloy from which the tin is to be removed, forming on such bath a layer of slag containing lead chloride and an oxidizing agent adapted to react upon the resulting tin chloride formed in the slag and also upon the tin in the bath for converting both tins into tin oxide which remains in inactive condition in the slag.

9. A process for separating tin from materials containing metallic tin which comprises reactively contacting the materials with lead chloride and converting the resulting tin chloride into tin oxide which remains as an inactive constituent of the resulting slag.

10. A process for separating tin from materials containing metallic tin which comprises reactively contacting the materials with lead chloride and lead oxide.

11. A process of removing tin from alloys containing tin which comprises forming a molten bath of the tin-containing alloy, forming on such bath a layer of slag containing lead chloride and lead oxide, and bringing the slag and bath into reactive contact for enabling the lead oxide to act upon the resulting tin chloride formed in the slag and also upon the tin in the bath to convert both tins into tin oxide which remains in inactive condition in the slag.

12. A process of separating tin from materials containing metallic tin which comprises reacting upon a tin-containing bath with a slag containing lead chloride and a reactant adapted to convert the resulting tin compound into an inactive material retained in the slag.

13. A process of separating tin from materials containing metallic tin which comprises reacting a tin-containing bath with a slag containing lead chloride and lead oxide in amounts sufficient to react with the tin chloride produced in the slag and also upon the tin in the bath to completely convert substantially all of the tin into tin oxide which remains inactive in the slag with corresponding regeneration of lead chloride.

14. A process of separating tin from materials containing metallic tin which comprises reacting a tin-containing bath with a slag containing lead chloride and an oxidizing agent adapted to convert the tin chloride resulting from the reaction into tin oxide which is retained in the slag.

15. The process for treating tin alloys which comprises oxidizing such an alloy in the presence of lead chloride thereby concentrating tin as a slag; recovering lead chloride from said slag by fuming same whereby the tin remains as a tin-rich residue and utilizing the recovered lead chloride for the treatment of additional quantities of tin alloy.

JESSE O. BETTERTON.
CHARLES N. WATERMAN.